United States Patent
Royer et al.

(10) Patent No.: US 9,938,902 B2
(45) Date of Patent: Apr. 10, 2018

(54) TURBOMACHINE COMPRISING A PRIVILEGED INJECTION DEVICE AND CORRESPONDING INJECTION METHOD

(75) Inventors: Eric Royer, Serres Morlaas (FR); Philippe Jean Rene Marie Benezech, Morlaas (FR); Pascal Rupert, Lons (FR)

(73) Assignee: TURBOMECA, Bordes (FR)

( * ) Notice: Subject to any disclaimer, the term of this patent is extended or adjusted under 35 U.S.C. 154(b) by 607 days.

(21) Appl. No.: 14/000,765

(22) PCT Filed: Feb. 17, 2012

(86) PCT No.: PCT/FR2012/050345
§ 371 (c)(1),
(2), (4) Date: Aug. 21, 2013

(87) PCT Pub. No.: WO2012/114025
PCT Pub. Date: Aug. 30, 2012

(65) Prior Publication Data
US 2014/0000276 A1    Jan. 2, 2014

(30) Foreign Application Priority Data

Feb. 21, 2011 (FR) ...................... 11 51388

(51) Int. Cl.
*F02C 7/22*    (2006.01)
*F02C 7/228*    (2006.01)
(Continued)

(52) U.S. Cl.
CPC ............. *F02C 7/22* (2013.01); *F02C 7/228* (2013.01); *F02C 9/28* (2013.01); *F02C 9/34* (2013.01);
(Continued)

(58) Field of Classification Search
CPC .... F02C 7/228; F02C 7/22; F02C 7/28; F02C 9/28; F02C 9/34; F05D 2270/309; F05D 2270/091; F05D 2270/31
See application file for complete search history.

(56) References Cited

U.S. PATENT DOCUMENTS 2,636,553 A * 4/1953 Havelock ................. F02C 7/22
123/343
4,217,754 A * 8/1980 Schmidt-
Roedenbeck ............ F02C 9/28
60/39.281
(Continued)

FOREIGN PATENT DOCUMENTS

CN    1069561 A    3/1993
CN    1216338 A    5/1999
(Continued)

OTHER PUBLICATIONS

Office Action dated May 6, 2015 in Chinese Patent Application No. 2012800091122 (English language translation only).
(Continued)

*Primary Examiner* — Carlos A Rivera
(74) *Attorney, Agent, or Firm* — Oblon, McClelland, Maier & Neustadt, L.L.P.

(57) ABSTRACT

A turbomachine including: a combustion chamber, with a fuel injection device in the combustion chamber; a supply mechanism supplying fuel to the fuel injection device; a mechanism determining instantaneous variation of fuel flow rate of the supply mechanism; and a regulation mechanism regulating the fuel flow rate of the injection device according to the instantaneous variation of the fuel flow rate of the supply mechanism determined by the determination mechanism.

9 Claims, 2 Drawing Sheets

(51) Int. Cl.
*F02C 9/28* (2006.01)
*F02C 9/34* (2006.01)

(52) U.S. Cl.
CPC .. *F05D 2270/091* (2013.01); *F05D 2270/309* (2013.01); *F05D 2270/31* (2013.01)

(56) References Cited

U.S. PATENT DOCUMENTS

| | | | |
|---|---|---|---|
| 5,257,502 A | 11/1993 | Napoli | |
| 5,321,949 A | 6/1994 | Napoli et al. | |
| 5,345,757 A | 9/1994 | MacLean et al. | |
| 5,404,709 A | 4/1995 | Mac Lean et al. | |
| 6,230,479 B1* | 5/2001 | Kawamura | F02C 9/26 60/773 |
| 6,945,030 B2* | 9/2005 | Hirayama | F02C 9/28 60/39.27 |
| 7,003,939 B1 | 2/2006 | Rackwitz et al. | |
| 7,076,940 B2* | 7/2006 | Hirayama | F02C 9/28 60/39.27 |
| 7,117,662 B2* | 10/2006 | Hirayama | F02C 9/28 60/39.27 |
| 2003/0014979 A1 | 1/2003 | Summerfield et al. | |
| 2008/0245074 A1* | 10/2008 | Oda | F02C 7/228 60/737 |
| 2016/0109133 A1* | 4/2016 | Edwards | H02J 1/00 60/786 |

FOREIGN PATENT DOCUMENTS

| | | |
|---|---|---|
| DE | 100 32 471 | 1/2002 |
| EP | 0 399 692 A1 | 11/1990 |
| EP | 0 522 832 | 1/1993 |
| EP | 1 278 014 | 1/2003 |
| GB | 2 450 515 | 12/2008 |
| JP | 63 201329 | 8/1988 |
| JP | 2000-27660 A | 1/2000 |

OTHER PUBLICATIONS

International Search Report dated Jun. 21, 2012 in PCT/FR12/50345 Filed Feb. 17, 2012.
English language translation of Notice of Rejection dated Jan. 26, 2016 in Japanese Patent Application No. 2013-553987.
Office Action dated Mar. 27, 2017 in European Patent Application No. 12 709 928.1.

* cited by examiner

TURBOMACHINE COMPRISING A PRIVILEGED INJECTION DEVICE AND CORRESPONDING INJECTION METHOD

DOMAIN OF THE INVENTION

The invention generally relates to the injection of fuel into a combustion chamber of turbomachines and more particularly to a device and a method for regulating privileged injection of fuel. The field of application of the invention is notably that of industrial turbomachines and aeronautical turbomachines.

The invention relates to a turbomachine in which the shaft of the gas generator is notably driven by gases passing through a combustion chamber in which fuel injection is achieved by means of an injection device. More specifically, the invention deals with a turbomachine equipped with a combustion chamber, with a fuel injection device in the combustion chamber and supply means for supplying fuel to the fuel injection device.

BACKGROUND OF THE INVENTION

A privileged supply system is known from document U.S. Pat. No. 6,857,272. This privileged supply system operates on the basis of predetermined operating ranges depending on the flow rate of the fuel, in which privileged injection is either enabled or not.

However, such a system has the drawback of being enabled even for operating conditions for which this is not necessary. Indeed, there exist steady state operating conditions with a low fuel flow rate which do not have any risk of extinction, wherein the privileged supply is enabled even when this is not necessary. In this case, a hot trail forms, which may in certain extreme cases ovalize the turbine rings.

OBJECT AND SUMMARY OF THE INVENTION

The object of the invention is to propose a turbomachine and a method for regulating fuel injection in which the combustion of the fuel in the combustion chamber remains not very affected by the strong speed variations of the turbomachine while avoiding the formation of a hot trail.

This object is achieved by the fact that the turbomachine further includes means for determining the instantaneous variation of the fuel flow rate of the supply means, and regulation means for regulating the fuel flow rate from the injection device depending on the instantaneous variation of the fuel flow rate of the supply means, determined by the determination means.

By «instantaneous variation» is meant a variation over a very short period, for example over a period of half a second (0.5 s) or less or further of the order of a quarter of a second (0.25 s) or less. In order to determine the required fuel flow rate in the combustion chamber, the regulation means notably use as a parameter the instantaneous variation of the fuel flow rate of the supply means. This variation is representative of the operating conditions of the turbomachine. Thus, the flow rate of fuel delivered into the combustion chamber by the injection device is adjusted depending on the instantaneous variation of the fuel flow rate of the supply means, i.e. depending on variations of operating conditions of the turbomachine.

Let us note that if the instantaneous fuel flow rate of the supply means increases, the instantaneous variation of the flow rate of the supply means is positive. Conversely, if the instantaneous fuel flow rate of the supply means decreases, the instantaneous variation of the flow rate of the supply means is negative. Thus, during acceleration, the instantaneous variation of the flow rate of the supply means is positive, while the latter is negative during deceleration.

For example, if the instantaneous variation is large, either positive or negative, then the regulation means adjust the fuel flow rate of the injection device. Thus, it is possible to ensure a minimum fuel flow rate of the injection device in the combustion chamber which sustains combustion. In other words, when the determination means determine a strong instantaneous variation, notably lowering of the flow rate of the supply means, the regulation means may ensure a minimum fuel flow rate of the injection device in the combustion chamber in order to avoid extinction of the combustion of the fuel in the combustion chamber.

By regulating the injection of the fuel according to the variation of the flow rate of the supply means, the formation of hot trails is avoided, such as those encountered in the state of the art, while preventing risks of extinction of the combustion. Indeed, the inventors have noticed that the variation of the fuel flow rate of the supply means is a more relevant parameter of the combustion extinction risk than the actual fuel flow rate (of the supply means or of the injection device).

Preferentially, the injection device comprises an injection ramp comprising at least one privileged injector and at least one main injector.

Preferentially, the regulation means allow an increase in the fuel flow rate of the privileged injector relatively to the fuel flow rate of the main injector if the value of the instantaneous variation of the fuel flow rate of the supply means becomes less than a predetermined threshold.

Injection of fuel into the combustion chamber is ensured by the injection ramp comprising a so-called main injector (or set of injectors) on the one hand, and a so-called privileged injector (or set of injectors) on the other hand. Under normal operating conditions, the injection is ensured by the main injector and by the privileged injector. Preferentially, under normal operating conditions, the fuel flow rate of the privileged injector is substantially equal to the flow rate of the main injector. In other words, in the case when there are several privileged and/or main injectors, under normal operating conditions, the flow rate of each privileged injector is preferentially equal to the flow rate of each main injector.

By "normal operating conditions", are meant operating conditions when the fuel flow rate of the supply means slightly varies or varies according to transients not having any risk of extinguishing the combustion of the fuel in the combustion chamber. When the turbomachine operates in abnormal operating conditions, for example in the case of a sudden variation in the fuel flow rate of the supply means, there exists a risk of extinguishing combustion. For example, such an extinction risk occurs during emergency braking (also known under the name of "quick stop") which consists of having a helicopter adopt a nose-up attitude. During this transient, the rotor no longer draws power from the turbomachine and the fuel flow rate of the supply means decreases very rapidly until it attains a quasi-zero value in less than 0.5 s, or less, depending on the suddenness of the maneuver on the reactivity of the regulation device of the machine. Then, according to the invention, under abnormal operating conditions, the flow rate of the privileged injector is increased relatively to the flow rate of the main injector, so as to avoid interruption of the injection or too sudden reduction in the fuel injection flow rate and extinction of the combustion in the combustion chamber. More particularly, when the value of the instantaneous variation of the fuel flow rate of the supply means is less than a predetermined threshold, injection is ensured in a privileged way by the privileged injector, i.e. the fuel flow rate of the privileged injector is increased relatively to the flow rate of the main injector. Thus, if under normal operating conditions, the flow rate of the privileged injector is equal to the flow rate of the main injector, it is understood that under abnormal operating conditions, the flow rate of the privileged injector is then greater than the flow rate of the main injector.

Advantageously, when the value of the instantaneous variation of the fuel flow rate of the supply means is less than a predetermined threshold, injection into the combustion chamber is ensured by the privileged injector, used alone or combined with the main injector, with the flow rate of the latter being less than the flow rate of the privileged injector. Thus, fuel injection at the privileged injector may be carried out at the expense of fuel injection achieved by the main injector. That is to say that the regulation means give priority to injection by the privileged injector by increasing the flow rate of the privileged injector relatively to the flow rate of the main injector while decreasing the flow rate of the main injector relatively to the flow rate of the privileged injector, even if this should cause the injection by the main injector to be cut off. Thus, according to this alternative, regardless of the fuel supply flow rate of the fuel injection device, the regulation means ensure a minimum fuel injection flow rate by the privileged injector, thereby avoiding extinction of the combustion.

Preferentially, the predetermined threshold is equal to a negative value corresponding to a strong instantaneous decrease in the fuel flow rate of the supply means which is not considered as a transient relatively to normal operating conditions (i.e., which is considered as a transient relatively to abnormal operating conditions), i.e. which may cause extinction of the combustion of fuel in the combustion chamber. Thus, it is possible to very suddenly decelerate the operating speed of the turbomachine according to the invention without any risk of extinction of the combustion of fuel in the combustion chamber.

Preferentially, the regulation means give the possibility of distributing the fuel flow rate from the injection ramp so as to increase the fuel flow rate of the privileged injector relatively to the fuel flow rate of the main injector.

It is understood that for a global flow rate delivered within the combustion chamber, this global flow rate corresponding to the global flow rate of the injection ramp, the regulation means distribute this global flow rate between the privileged injector and the main injector so as to increase the flow rate of the privileged injector relatively to the flow rate of the main injector. Thus, in order to retain this given global flow rate, increasing the flow rate of the privileged injector causes decrease in the flow rate of the main injector.

Advantageously, the regulation means comprise a distributor of the fuel flow between the privileged injector and the main injector.

The flow distributor gives the possibility of distributing the fuel supply flow from the injection ramp between the main injector and the privileged injector. This distributor may be a mechanical or hydromechanical member of the check valve and spring(s) type or an electromechanical member of the solenoid valve type, the latter may for example be controlled by an electronic control unit (or ECU). According to an alternative, each injector is driven independently by an ECU, the latter being then able to play the role of a distributor.

Advantageously, the supply means comprise a fuel meter, the instantaneous variation of the fuel flow rate of the supply means being measured by means of a resolver connected to the fuel meter.

With a fuel meter, it is possible to adjust the fuel flow rate. By means of a resolver, it is possible to measure the position, and the displacement speed of the meter. Thus, it is possible to measure the instantaneous variation of the fuel flow rate of the meter, each position of the meter being associated with a predetermined flow rate, and therefore of the supply means. For example, considering that the complete travel of the meter varies between 0 and 100 (0: totally closed meter; 100: totally open meter), it is considered that an instantaneous variation of −40/s (minus 40 per second), i.e. a variation of 40 of the position of the meter in the direction of the closing of the meter in one second, forms a threshold value for enabling regulation of the fuel flow rate in the combustion chamber. In other words, a variation of −40% per second of the position of the meter may be taken as a threshold value.

According to an alternative, the supply means comprise a fuel meter and a control of the meter for adjusting the fuel flow rate delivered by the meter, the instantaneous variation of the fuel flow rate of the supply means being determined from the reading of set values sent to the control of the meter for adjusting the fuel flow rate delivered by the meter.

By means of this alternative, the set value giving the possibility of controlling the position of the meter, in other words the opening/closing of the meter, is used as a parameter for measuring the instantaneous variation of the fuel flow rate of the supply means. The measurement of the instantaneous variation of the fuel flow rate of the supply means by means of the control set value of the meter is more accurate and more rapid than that carried out by means of a resolver since an internal set value of the supply means is directly processed and an intermediate measurement conducted via the resolver is avoided. In the same way as earlier, a set value controlling a variation of −40% per second of the position of the meter may be taken as a threshold value for enabling regulation of the fuel flow rate in the combustion chamber.

Advantageously, the turbomachine further comprises a gas generator shaft, and means for measuring the instantaneous acceleration of the gas generator shaft, the fuel flow rate of the injection device being further regulated according to the instantaneous acceleration of the gas generator shaft. Of course this regulation of the fuel flow rate of the injection device according to the instantaneous acceleration of the gas generator shaft is carried out by the regulation means.

Preferentially, the regulation means give the possibility of suppressing the increase in the fuel flow rate of the privileged injector relatively to the flow rate of the main injector if the value of the instantaneous acceleration of the gas generator shaft is greater than a predetermined threshold.

The instantaneous acceleration (in rotation) of the gas generator shaft is an indicator of the operating conditions and of the operating condition transients of the turbomachine. Thus, it may be considered that from a certain predetermined threshold of the instantaneous acceleration of the gas generator shaft, there no longer exists any risk of extinction of the combustion in the combustion chamber and that it is no longer required that the fuel flow rate of the privileged injector be greater than the fuel flow rate of the main injector. In other words, the measurement means give the possibility of measuring the deceleration (i.e. a negative acceleration) of the gas generator shaft. The deceleration of the gas generator shaft reflects a situation in which there may exist a risk of combustion extinction in the combustion chamber. For example it may be considered that there no longer exists any risk of combustion when this deceleration becomes zero. Subsequently, the generic term of "acceleration" is used, this term covering both positive accelerations and negative accelerations, i.e. decelerations.

For example, zero instantaneous acceleration may thus be used as a predetermined threshold. Indeed, following sudden deceleration, zero instantaneous acceleration indicates that the turbomachine has left the abnormal operating conditions, that it is in an acceleration phase (switch from negative acceleration to zero acceleration), so that there no longer exists any risk of extinction of the combustion in the combustion chamber. According to an alternative, the predetermined threshold is equal to 3% of the rated speed (of rotation) of the gas generator shaft per second.

According to an alternative, the regulation means give the possibility of gradually suppressing the increase in the fuel flow rate of the privileged injector with respect to that of the main injector. The gradualness of the suppression allows injection to be secured in the combustion chamber. Indeed, a too sudden suppression of the increase of the flow rate of the privileged injector might generate a risk of micro-cuts in the fuel supply of the privileged injector. It will be noted that a cut-off of the supply for a period of the order of three thousandths of a second is sufficient for extinguishing combustion in the combustion chamber. For example, suppression of the increase in flow rate is achieved by a series of several plateaus for reducing the flow rate increase. For example, the suppression of the flow rate increase is achieved by a series of ten plateaus each corresponding to a 10% reduction in the total value of the total fuel flow rate increase. Generally, in order to avoid micro-cut phenomena, the increases and/or decreases in the flow rate of the privileged and/or main injector are advantageously controlled gradually.

The invention also relates to a method for regulating fuel injection of a turbomachine according to the invention, including the steps of:
    determining the instantaneous variation of the fuel flow rate of the supply means, and
    regulating the fuel flow rate of the injection device according to the instantaneous variation of the fuel flow rate of the supply means.

In order to regulate the fuel flow rate in the combustion chamber of a turbomachine, the method consists of determining the instantaneous variation of the fuel flow rate of the supply means on the one hand, and of using the thereby determined instantaneous variation as a parameter for regulating the instantaneous flow rate of fuel of the injection device on the other hand. This method is applied on a turbomachine according to the invention, wherein the step for determining the instantaneous variation of the fuel flow rate of the supply means is achieved by means for determining the instantaneous variation of the fuel flow rate of the supply means. The instantaneous regulation step for the fuel flow rate is achieved by means for regulating the fuel flow rate in the combustion chamber.

Let us note that within the scope of the application of this method, regulation of the flow rate may be accomplished automatically, but also be enabled manually, for example when the user intends to preventively secure his/her use of the turbomachines under conditions having a risk of extinction of the combustion of fuel. In other words, the user may force privileged injection, by increasing the flow rate of the privileged injector relatively to the flow rate of the main injector, in order to secure the use of the turbomachine. The conditions of use of a turbomachine having a risk of extinction of the combustion of fuel are notably conditions when the turbomachine operates under operating conditions close to idling, or when the surrounding medium has a risk of ingesting water (rain or snow) into the turbomachine.

Moreover, this method may advantageously be enabled or disabled, within the scope of tests of the turbomachine, in order to preventively evaluate the stability of combustion in the combustion chamber (and therefore the risk of extinction under given conditions) independently of the device. This type of operation also allows evaluation of the safety margin given by this method for regulating fuel injection into the combustion chamber and by the associated device. This type of handling also gives the possibility of testing proper operation of the device.

Preferentially, the fuel flow rate of the privileged injector is increased relatively to the fuel flow rate of the main injector if the value of the instantaneous variation of the fuel flow rate of the supply means becomes less than a predetermined threshold.

This additional step of the method allows improvement of its application by using an injector dedicated to privileged injection allowing better regulation of the flow rate. It is understood that the predetermined threshold value is preferentially selected so that when the value of the instantaneous variation of the fuel flow rate of the supply means becomes less than a predetermined threshold, the turbomachine undergoes a strong variation of operating conditions.

The application of this additional step has several alternatives. It is understood that generally, when the fuel flow rate of the privileged injector is increased relatively to the fuel flow rate of the main injector (under abnormal turbomachine operating conditions), the value of the increased flow rate of the privileged injector is greater than the value of the fuel flow rate of the privileged injector under normal operating conditions (at equivalent speed of rotation and load of the turbomachine). Conversely, when the operating conditions of the turbomachine become normal again, it is understood that the increase in the flow rate of the privileged injector is suppressed and its value is less than the value of the flow rate under abnormal operating conditions (at equivalent speed of rotation and load of the turbomachine).

According to a first alternative, the privileged injector delivers a set and predetermined fuel flow rate, when the value of the instantaneous variation of the fuel flow rate of the supply means becomes less than the predetermined threshold. Conversely, the privileged injector delivers a variable fuel flow rate and preferentially equal to the flow rate of the main injector, when the value of the instantaneous variation of the fuel flow rate of the supply means becomes greater than the predetermined threshold.

According to a second alternative, the predetermined threshold is a series of predetermined values. When the instantaneous variation of the fuel flow rate of the supply means becomes less than a first predetermined value, the privileged injector injects fuel according to a first set and predetermined flow rate. Next, if the variation becomes less than a second predetermined value, less than the first predetermined value, the first flow rate of the privileged injector is increased in order to attain a second set and predetermined flow rate greater than the first flow rate. Thus, the privileged injector may inject the fuel by increasing, respectively decreasing, its flow rate according to as many increments, respectively decrements as there are predetermined threshold values, in order to attain a maximum flow rate, respectively a flow rate corresponding to the flow rate under normal operating conditions (i.e. minimum flow rate).

According to a third alternative, the predetermined threshold is a continuous range of predetermined values. When the instantaneous variation of the flow rate of the supply means enters this range of values, the flow rate of the privileged injector is increased relatively to the flow rate of the main injector in order to deliver a fuel flow rate proportional to the value of the instantaneous variation, continuously over the range of values. Thus, the flow rate is increased relatively to the flow rate of the main injector when the instantaneous variation becomes slightly less than the first limit of the range of predetermined values, and it continuously increases up to a maximum flow rate when the instantaneous variation decreases until it becomes lower than the second limit of the range of predetermined values. Conversely, the flow rate of the privileged injector decreases when the instantaneous variation becomes greater than the second limit of the range of predetermined values, until it reaches a fuel flow rate corresponding to the flow rate under normal operating conditions when the instantaneous variation becomes greater than the first limit of the range of predetermined values.

Thus, it is understood that when the operating conditions of the engine are considered as having a risk of extinction of combustion, the flow rate of the privileged injector is increased relatively to the flow rate of the main injector, the privileged injector thereby ensuring a standby function aiming at preventing the stopping of combustion, while, when the engine operating conditions no longer have any risk of extinction of the combustion, the flow rate of the privileged injector corresponds to the flow rate of fuel under normal operating conditions, when it is not increased relatively to the flow rate of the main injector.

Preferentially, the fuel flow rate of the privileged injector is increased relatively to the fuel flow rate of the main injector by distributing the global flow of the injection device in a privileged way towards the privileged injector.

Advantageously, the fuel flow rate of the privileged injector is increased for a predetermined period.

It is therefore understood that when this predetermined period has elapsed, the flow rate increase is suppressed and the fuel flow rate of the privileged injector returns to a flow rate value corresponding to the fuel flow rate under normal operating conditions. For example, the predetermined period is equal to 15 seconds (15.0 s).

Advantageously, the instantaneous acceleration of the gas generator shaft is further measured, and the fuel flow rate of the injection device is further regulated depending on the instantaneous acceleration of the gas generator shaft.

Preferentially, when the fuel flow rate of the privileged injector has increased, the increase of the flow rate of the privileged injector relatively to the flow rate of the main injector is suppressed when the value of instantaneous acceleration of the gas generator shaft is (or again becomes) greater than one (or said) predetermined threshold.

Preferentially, the increase of flow rate of the privileged injector relatively to the flow rate of the main injector is suppressed after a predetermined period has elapsed.

BRIEF DESCRIPTION OF THE DRAWINGS

The invention and its advantages will be better understood upon reading the detailed description made hereafter of different embodiments given as non-limiting examples. This description refers to the appended figures, wherein.

MORE DETAILED DESCRIPTION

Figure 1:
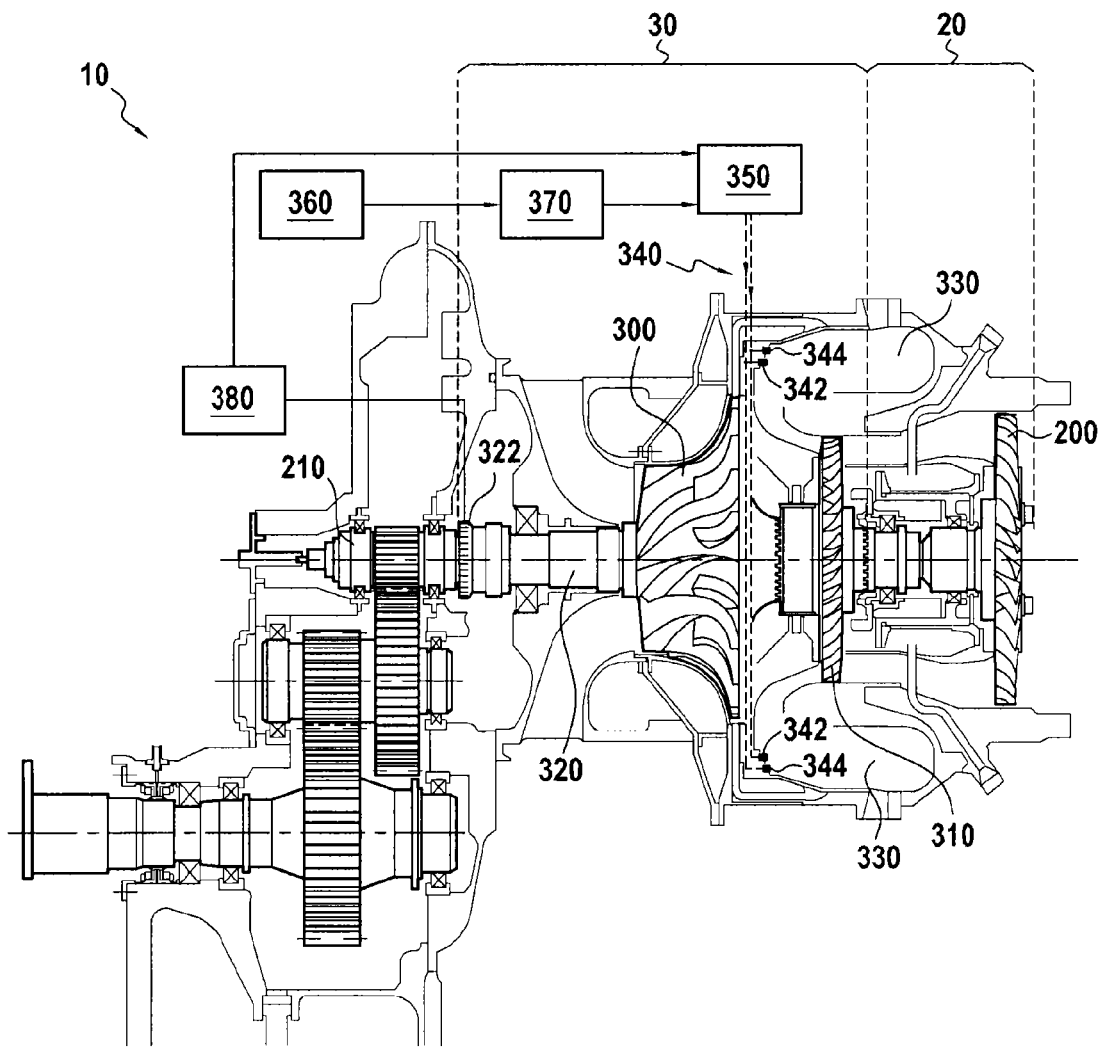
FIG. 1 schematically illustrates a turbomachine according to the invention.

FIG. 1 illustrates a turbomachine 10 comprising a free turbine 20 and a gas generator 30. The gas generator 30 includes a compressor 300, a turbine wheel 310 mounted on a gas generator shaft 320 and a combustion chamber 330. The gases leaving the gas generator 30 drive the turbine wheel 200 of the free turbine 20 mounted on a turbine shaft 210, into rotation.

The turbomachine 10 is further equipped with an injection device 340 comprising an injection ramp comprising main injectors 342 and privileged injectors 344. The injection device 340 is regulated by regulation means 350 in order to regulate the fuel flow rate in the combustion chamber 330. The regulation means 350 are notably intended for increasing the flow rate of the privileged injectors 344. Supply means 360 supply the injection device 340 with fuel. For the clarity of the figure, the connections between the supply means 360 and the injection device 340 are not illustrated. The supply means 360 comprise a fuel meter and a control of the meter (not shown).

The turbomachine 10 also comprises determination means 370 for determining the instantaneous variation of the fuel flow rate of the supply means 360. These determination means 370 for example comprise a computer and a memory (not shown) including means for reading the set values sent to the control of the fuel meter (control set values). The determination means 370 are connected to the regulation means 350.

Moreover, the turbomachine 10 comprises the measurement means 380 for measuring the acceleration of the gas generator shaft 320. These measurement means 380 measure the speed of rotation of the gas generator shaft, from which is inferred the acceleration of the gas generator shaft 320, from the phonic wheel 322 firmly attached to the gas generator shaft 320 and for example, by means of a computer and a memory (not shown). The measurement means 380 are connected to the regulation means 350.

The arrows on the connections between the supply means 360, and the determination means 370, the measurement means 380, the regulation means 350 and the injection device 340 represent the flows of information circulating among these different elements.

Figure 2:
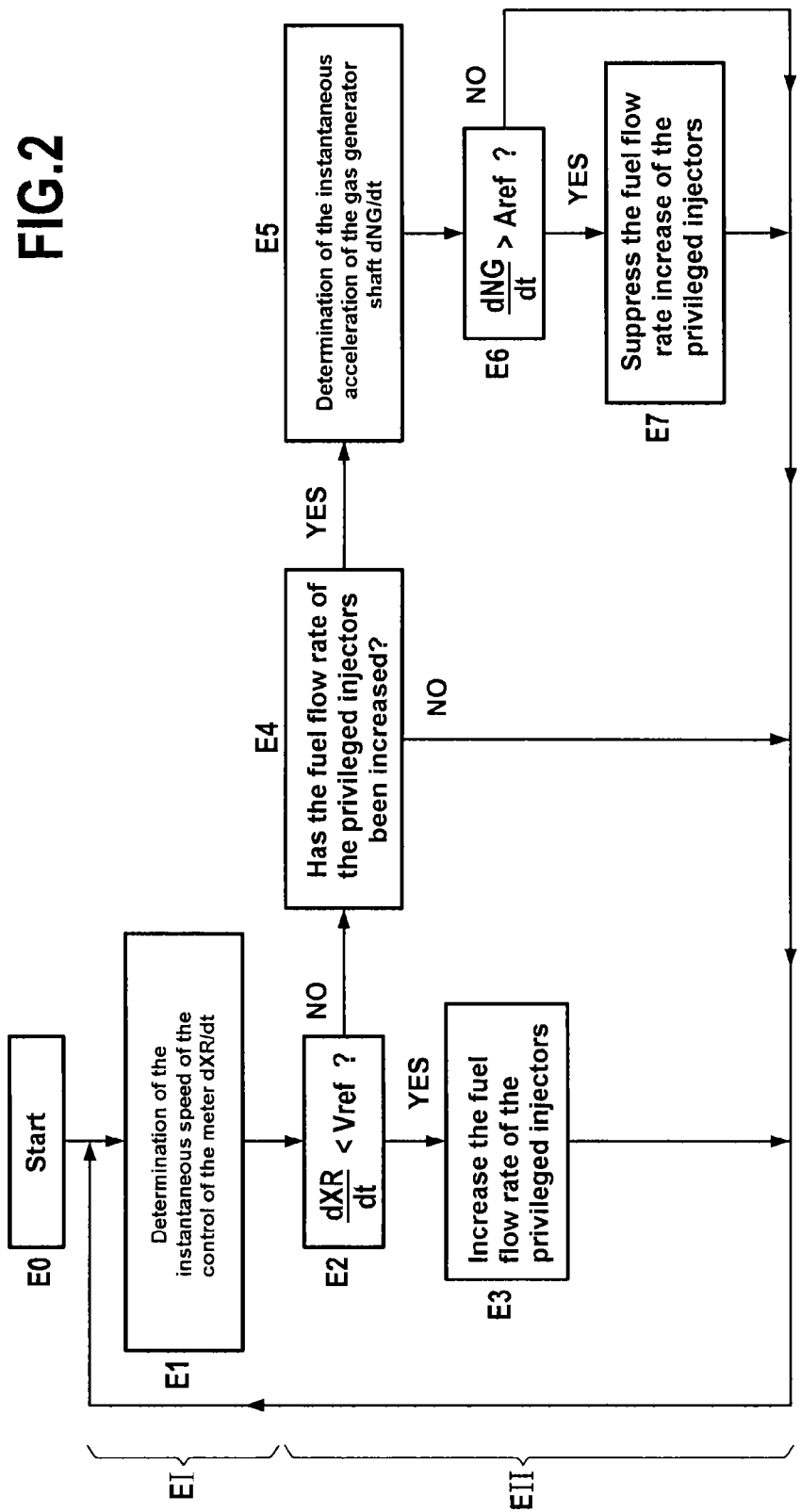
FIG. 2 illustrates a flow chart describing the steps of the regulation method according to the invention.

The operation of this turbomachine 10 is described with reference to FIG. 2. The flow chart of FIG. 2 illustrates the method according to the invention for automatically regulating the fuel injection into the combustion chamber 330 of the turbomachine 10.

The method preferably begins when the turbomachine has started and stops when the turbomachine is stopped, even if this happens during execution of the method. For this reason, there is no "end" for indicating the end of the method in FIG. 2. Subsequently, for designating a completely performed cycle of the regulation method, we shall use the term of "regulation cycle".

The method therefore starts with step E0 «start». The method is then divided into two main steps: a first step EI where the instantaneous variation of the fuel flow rate of the supply means 360 is determined, and a second step EII where the instantaneous fuel flow rate is regulated in the combustion chamber 330 according to the instantaneous variation of the fuel flow rate of the supply means 360, determined during step EI.

The step EI comprises a single step E1 which consists of determining the instantaneous speed dXR/dt of the meter, XR corresponding to the position of the meter. This instantaneous speed determination is achieved in a known way, moreover by determination means 370, and in particular by means for reading the set value sent to the control of the meter in order to drive the position of the meter, of the computer and of the memory of the determination means 370. It will be noted that the speed of the meter is positive if the control set value aims at increasing the flow rate of the meter while it is negative if the control set value aims at reducing the flow rate of the meter. At the end of step E1, the first step EI for determining the instantaneous variation of the fuel flow rate of the supply means 360 is completed. Indeed, the instantaneous speed dXR/dt of the meter is representative of the variation of the fuel flow rate of the supply means 360. At the end of step EI, the method switches to step EII. In other words, at the end of step E1, the method switches to step E2.

The step E2 consists of comparing the value of the instantaneous speed dXR/dt of the meter relatively to a predetermined threshold value $V_{ref}$. It will be noted that during a sudden deceleration of the turbomachine the instantaneous speed dXR/dt is negative and therefore for detecting this sudden deceleration, the threshold value $V_{ref}$ is also negative. If the instantaneous variation of the instantaneous dXR/dt is less than the predetermined threshold value $V_{ref}$ ("YES" at the end of step E3), the method determines whether there is a risk of extinction of combustion and switches to step E3. If the instantaneous speed dXR/dt is greater than or equal to the predetermined threshold value $V_{ref}$ ("NO" at the end of step E3), the method switches to step E4. The step E2 is carried out by the regulation means 350.

The step E3 consists of increasing the flow rate of the privileged injectors 344 relatively to the flow rate of the main injectors 342, this increase being achieved the regulation means 350. When the flow rate of the privileged injectors is increased, the step EII for regulating the instantaneous flow rate is completed; the regulation method completes its regulation cycle and starts a subsequent cycle by again beginning from step E1. Of course, the execution of a subsequent regulation cycle may be timed out. That is to say that the execution of the subsequent step is not immediate, and a certain delay elapses before executing this subsequent cycle. This time-out is achieved for example between step EII and step EI.

Moreover, it is understood that, if during the next cycle, the step E2 also leads to step E3, depending on the alternatives, the fuel flow rate of the privileged injector may again be increased or else be maintained at the level at which it was increased during the previous cycle.

The step E4 consists of checking that the flow rate of the privileged injectors 344 has not increased relatively to the flow rate of the main injectors 342, this increase for example resulting from a step E3 carried out during a previous regulation cycle. This operation is also achieved by the regulation means 350. If the flow rate of the privileged injector 344 is increased ("YES" at the end of step E4), the method then passes to step E5, steps E5 to E7 consisting of determining whether this flow rate increase of the privileged injectors may be suppressed. In other words, during steps E5 to E7, the regulation means 350 determine whether a risk of extinction of the combustion in the combustion chamber 330 is ruled out and they regulate the flow rate of the privileged injectors 344 accordingly. If the flow rate of the privileged injectors 344 is not increased relatively the flow rate of the main injectors 342 ("NO" at the end of step E5), the instantaneous flow rate regulation step EII in the combustion chamber 330 is completed, the regulation method completes its regulation cycle and starts a subsequent cycle by again beginning from step E1.

The step E5 consists of determining the instantaneous acceleration dNG/dt of the gas generator shaft 320, NG corresponding to the speed of rotation of the gas generator shaft 320. This determination is moreover achieved continuously by measurement means 380, in particular by means of the phonic wheel 322, of the memory and of the computer of the measurement means 380. At the end of step E5, the method switches to step E6.

The step E6 consists of comparing the value of the instantaneous acceleration dNG/dt of the gas generator shaft 320 relatively to a predetermined threshold value $A_{ref}$. This step is achieved by the regulation means 350. If the instantaneous acceleration dNG/dt is greater than or equal to the predetermined threshold value $A_{ref}$ ("YES" at the end of step E53), the method considers that the increase in the flow rate of the main injectors may be suppressed, and switches to step E7. If the instantaneous acceleration dNG/dt is less than the predetermined threshold value $A_{ref}$ ("NO" at the end of step E53), then the method considers that the risk of extinction of the combustion remains so that the fuel flow rate of the privileged injectors remains unchanged. In this case, the step EII for regulating the instantaneous flow rate of the fuel in the combustion chamber 310 is completed, the regulation method completes its regulation cycle and starts a subsequent cycle by again beginning from step E1.

The step E7 consists of suppressing the increase in the fuel flow rate of the privileged injectors 344 so that their flow rate again becomes equal to the flow rate of the main injectors 342. This suppression is gradual, for example over a period of the order of three seconds (3.0 s), in order to avoid unpriming of the privileged injectors. Moreover, in the case when the main injectors would be switched off, their switching on is also gradual. At the end of the step E7, the instantaneous flow rate regulation step EII is completed; the method for regulating the instantaneous fuel flow rate in the combustion chamber 310 completes its regulation cycle and starts a subsequent cycle by again beginning with step E1.

According to an alternative, the regulation means 350 gradually suppress (or according to an alternative, instantaneously) the flow rate increase of the privileged injectors 344 after a time-out delay. For example, this delay is three seconds (3.0 s). With this delay it is possible to avoid that the flow rate of the privileged injectors 344 be brought back to the flow rate under normal operating conditions while the combustion in the combustion chamber 330 may still be unstable and have a risk of extinction. Thus, by timing out the gradual suppression of the flow rate increase of the privileged injectors 344, it is expected that the combustion stabilizes before gradual suppression of the flow rate increase of the privileged injectors 344. The safety of the turbomachine is thus improved. This time-out is achieved for example before or after step E7.

It is understood that in this alternative, the regulation means 350 record the time tn of the command for gradual suppression of the flow rate increase, and actually control the gradual suppression of the flow rate increase in the privileged injectors 344 during a subsequent regulation cycle, at a time tm≥tn+D (tm greater than or equal to tn plus D), D being the time-out delay, if the speed dXR/dt of the meter is always greater than or equal to the predetermined threshold value $V_{ref}$ and the acceleration dNG/dt of the gas generator shaft is greater than $A_{ref}$.

According to an alternative, the steps E5 and E6 are omitted, and the method directly switches from step E4 to step E7, if the answer is «YES» to step E4. Of course, gradual suppression of the increase in the flow rate may be timed out, as described above.

According to another alternative, the flow rate of the privileged injectors is increased, or according to an alternative, gradually increased, for a predetermined period in step E3. Thus, in this alternative, the steps E4 to E7 of FIG. 2 are omitted, and the flow rate increase in the privileged injectors is suppressed, or according to an alternative, gradually suppressed, automatically, at the end of a predetermined period. Of course, according to an alternative, a subsequent regulation cycle is carried out for a predetermined period, or according to still another alternative, the subsequent regulation cycle is only carried out when the predetermined period has elapsed.

The invention claimed is:

1. A turbomachine comprising:
   a combustion chamber, with a fuel injection device in the combustion chamber, the fuel injection device including an injection ramp including a privileged injector and a main injector, the privileged injector being disposed radially outward of the main injector;
   a fuel meter which supplies fuel to the fuel injection device;
   a gas generator shaft; and
   circuitry configured to
   determine an instantaneous variation of a fuel flow rate of the fuel meter,
   compare the instantaneous variation of the fuel flow rate of the fuel meter to a first predetermined threshold,
   increase a fuel flow rate to the privileged injector relative to the main injector if the instantaneous variation of the fuel flow rate of the fuel meter is less than the first predetermined threshold, the fuel meter supplying fuel to both the privileged injector and the main injector,
   determine an instantaneous acceleration of the gas generator shaft,
   compare the instantaneous acceleration of the gas generator shaft to a second predetermined threshold, and
   suppress the fuel flow rate to the privileged injector relative to the main injector so that the fuel flow rate to the privileged injector is equal to the fuel flow rate to the main injector if the instantaneous acceleration of the gas generator shaft is greater than the second predetermined threshold, the instantaneous variation of the fuel flow rate of the fuel meter is greater than or equal to the first predetermined threshold, and the fuel flow rate of the privileged injector is relatively higher than the fuel flow rate to the main injector, the fuel meter supplying fuel to both the privileged injector and the main injector.

2. The turbomachine according to claim 1, further comprising a distributor of fuel flow between the privileged injector and the main injector.

3. The turbomachine according to claim 1, wherein the instantaneous variation of the fuel flow rate of the fuel meter is measured by a resolver connected to the fuel meter.

4. The turbomachine according to claim 1, further comprising a control of the fuel meter for adjusting a fuel flow rate delivered by the fuel meter, and the instantaneous variation of the fuel flow rate of the fuel meter is determined from a reading of set values sent to the control of the fuel meter for adjusting the fuel flow rate delivered by the fuel meter.

5. The turbomachine according to claim 1, wherein the circuitry is configured to suppress the flow rate increase of the privileged injector relative to the fuel flow rate of the main injector after a predetermined period has elapsed.

6. A method for regulating the fuel injection of a fuel injection device in a combustion chamber of a turbomachine, the fuel injection device including an injection ramp including a privileged injector and a main injector, the turbomachine including a fuel meter which supplies fuel to the fuel injection device and a gas generator shaft, the method comprising:
   supplying fuel to both the privileged injector and the main injector using the fuel meter, the privileged injector being disposed radially outward of the main injector;
   determining an instantaneous variation of a fuel flow rate of the fuel meter;
   comparing the instantaneous variation of the fuel flow rate of the fuel meter to a first predetermined threshold;
   increasing a fuel flow rate to the privileged injector relative to the main injector if the instantaneous variation of the fuel flow rate of the fuel meter is less than the first predetermined threshold while the fuel meter supplies fuel to both the privileged injector and the main injector;
   determining an instantaneous acceleration of the gas generator shaft;
   comparing the instantaneous acceleration of the gas generator shaft to a second predetermined threshold; and
   suppressing the fuel flow rate to the privileged injector relative to the main injector so that the fuel flow rate to the privileged injector is equal to the fuel flow rate to the main injector if the instantaneous acceleration of the gas generator shaft is greater than the second predetermined threshold, the instantaneous variation of the fuel flow rate of the fuel meter is greater than or equal to the first predetermined threshold, and the fuel flow rate to the privileged injector is relatively higher than the fuel flow rate to the main injector, while the fuel meter supplies fuel to both the privileged injector and the main injector.

7. The method according to claim 6, wherein the fuel flow rate of the privileged injector is increased relatively to the fuel flow rate of the main injector by distributing a global flow from the injection device in a privileged way towards the privileged injector.

8. The method according to claim 6, wherein the fuel flow rate of the privileged injector is increased for a predetermined period.

9. The method according to claim 6, wherein the flow rate increase of the privileged injector relatively to the fuel flow rate of the main injector is suppressed after a predetermined period has elapsed.

* * * * *